Figure 1:
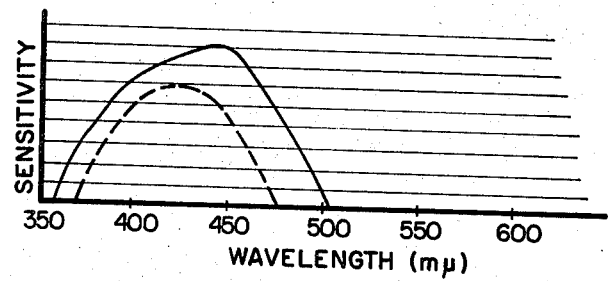

United States Patent
Levy

[15] 3,656,962
[45] Apr. 18, 1972

[54] SILVER HALIDE EMULSION CONTAINING LEAD OXIDE AS OPTICAL SENSITIZER

[72] Inventor: Boris Levy, Wayland, Mass.
[73] Assignee: Polaroid Corporation, Cambridge, Mass.
[22] Filed: Sept. 22, 1970
[21] Appl. No.: 74,380

[52] U.S. Cl..........................................96/120, 96/3, 96/29, 96/67, 96/108, 96/110
[51] Int. Cl........................................................G03c 1/02
[58] Field of Search..................96/120, 108, 110, 94, 94 BF

[56] References Cited

UNITED STATES PATENTS 3,208,860  9/1965  Armistead et al..........................96/94
3,219,451  11/1965  Lu Valle et al. .........................96/108
3,436,221  4/1969  Sprung......................................96/108

Primary Examiner—J. Travis Brown
Attorney—Brown and Mikulka, Robert M. Ford and Ann G. Leibowitz

[57] ABSTRACT

Spectral sensitization of silver halides dispersed in a colloid binder is achieved by providing orthorhombic lead oxide in intimate physical contact with the silver halide crystals.

8 Claims, 3 Drawing Figures

PATENTED APR 18 1972 3,656,962

INVENTOR.
BORIS LEVY

BY
Brown and Mikulka
and
Ann Y. Leibowitz
ATTORNEYS ns. Thus, in addition to involving costly and time-consuming vacuum deposition procedures and apparatus, such techniques are not necessarily applicable to conventional photographic silver halide emulsions.

SILVER HALIDE EMULSION CONTAINING LEAD OXIDE AS OPTICAL SENSITIZER

This invention relates to new processes for spectrally sensitizing photographic materials. More particularly, this invention relates to new processes for spectrally sensitizing photosensitive silver halide emulsions.

The term "spectral sensitization," or "optical sensitization," is generally used to denote processes and/or techniques by which a photoresponsive material, such as silver halide, is rendered responsive to electromagnetic radiation of wavelengths other than those appreciably absorbed by the material. In the case of silver halides, spectral sensitization is generally accomplished by the adsorption, on surfaces of the silver halide crystal, of one or more dyes selected from certain classes of dyes including, preferably, cyanine dyes and dyes related to them. For an extensive treatment of cyanine dyes particularly adapted to provide spectral sensitization of silver halide, see Hamer, F. N., *The Cyanine Dyes and Related Compounds*. In addition to cyanine dyes, certain other classes of dyes such as selected acridine, xanthene, diphenylmethane, triphenylmethane, stilbene, thiazole, quinoline, sulfur, pyronine and azo dyes, have also been employed as silver halide spectral sensitizers, either alone or in combination with additives providing enhancement of a selected dye's or plurality of dyes' sensitization capacity, and traditionally denoted in the art as supersensitizers.

Using dyes such as those just referred to, maximum spectral sensitization has been ordinarily to occur at a dye concentration level just less than or equal to a statistical monomolecular layer of dye coverage on the adsorbing surfaces of the crystal. Thus, it is the usual practice to add spectral sensitizing dyes in a quantity of 1 to 5 mg. or more of dye per gram of silver, depending on the nature of the dye and particular silver halide crystals being used. It is generally believed that spectral sensitization employing such dyes is due primarily to an electron transfer or energy transfer mechanism taking place at the dye-silver halide crystal interface. For a detailed theoretical discussion of such mechanisms, see Mees, C. E. K. and James, T. H., The Theory of the Photographic Process, Third Edition, The MacMillan Company, New York, 1966, Chapter 12.

Spectral sensitization may be distinguished from "chemical sensitization," a term generally applied to processes and/or techniques whereby a photoresponsive material, such as silver halide, is provided with an increased response to light over the wavelength frequency range corresponding to the inherent response characteristics of the material, i.e., the wavelengths naturally absorbed by the material. As examples of materials which have been employed as chemical sensitizers, mention may be made of various sulfur compounds, for example, those set forth in U.S. Pat. Nos. 1,574,944; 1,623,499; and 2,410,689; salts of noble metals such as ruthenium, rhodium, palladium, iridium, and platinum, for example, potassium chloroplatinate, sodium chloropalladite, ammonium chlororhodinate, and the like; gold salts, for example, potassium chloroaurate, potassium aurothiocyanate, auric trichloride and the like, as described in U.S. Pat. Nos. 2,597,856 and 2,597,915; reducing agents such as stannous salts, for example, stannous chloride, as described in U.S. Pat. No. 2,487,850; polyamines such as diethyltriamine, as described in U.S. Pat. No. 2,518,698 and spermine, as described in U.S. Pat. No. 2,521,925; and bis-(aminoethyl)-sulfide and its water-soluble salts, as described in U.S. Pat. No. 2,521,926, individually or in combination.

U.S. Pat. Nos. 3,219,450; 3,219,451; and 3,219,452 teach the sensitization of binder-free silver halide by the use of certain elements of the periodic table classified in Groups I through VI and VIII; alkylene oxides; organic sulfoxides; cupric ions; sodium hydroxide; and iron, tin, indium, tellurium, lead, and the salts thereof. The procedures outlined in these patents are directed to sensitizing microcrystalline silver halides of ultra-high purity, which in the absence of any colloidal binder are well known to exhibit a very low degree of inherent sensitivity as compared with gelatino silver halide emulsions. Thus, in addition to involving costly and time-consuming vacuum deposition procedures and apparatus, such techniques are not necessarily applicable to conventional photographic silver halide emulsions.

U.S. Pat. No. 3,033,682 discloses sensitization of photoresponsive elements, particularly photoresponsive silver halide crystals, using a combination of water-soluble plumbous and stannous salts, such as lead nitrate, lead acetate, stannous chloride, stannous bromide, and stannous sulfate. However, while such compounds may be effective for direct-writing, light-developing emulsions of the type with which the last-mentioned patent is concerned, as will be shown hereinafter, such soluble salts have little or no effect as regards the spectral sensitivity of conventional gelatino silver halide emulsions.

It is an object of the present invention to provide photoresponsive elements, and more particularly, photoresponsive silver halide emulsions, spectrally sensitized by being brought into relatively close physical contact with certain inorganic semiconductor materials. More particularly, it is an object of the present invention to provide spectrally sensitized photographic emulsions comprising silver halide crystals dispersed in a colloid binder, and orthorhombic lead oxide in intimate physical contact with said silver halide crystals.

Other objects of the invention will be in part be obvious and will in part appear hereinafter.

The invention accordingly comprises the process of the several steps and the relation and order of one or more of such steps with respect to each of the others, and the product possessing the features, properties, and relation of components which are exemplified in the following detailed disclosure, and the scope of the application of which will be indicated in the claims.

Figure 2:
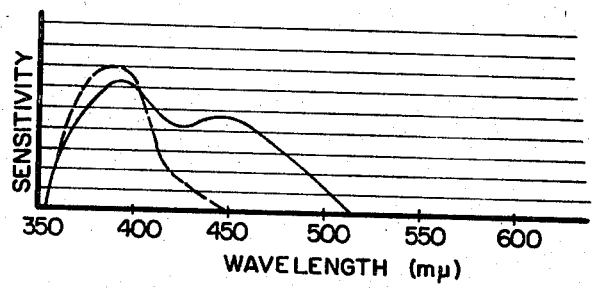
Figure 3:
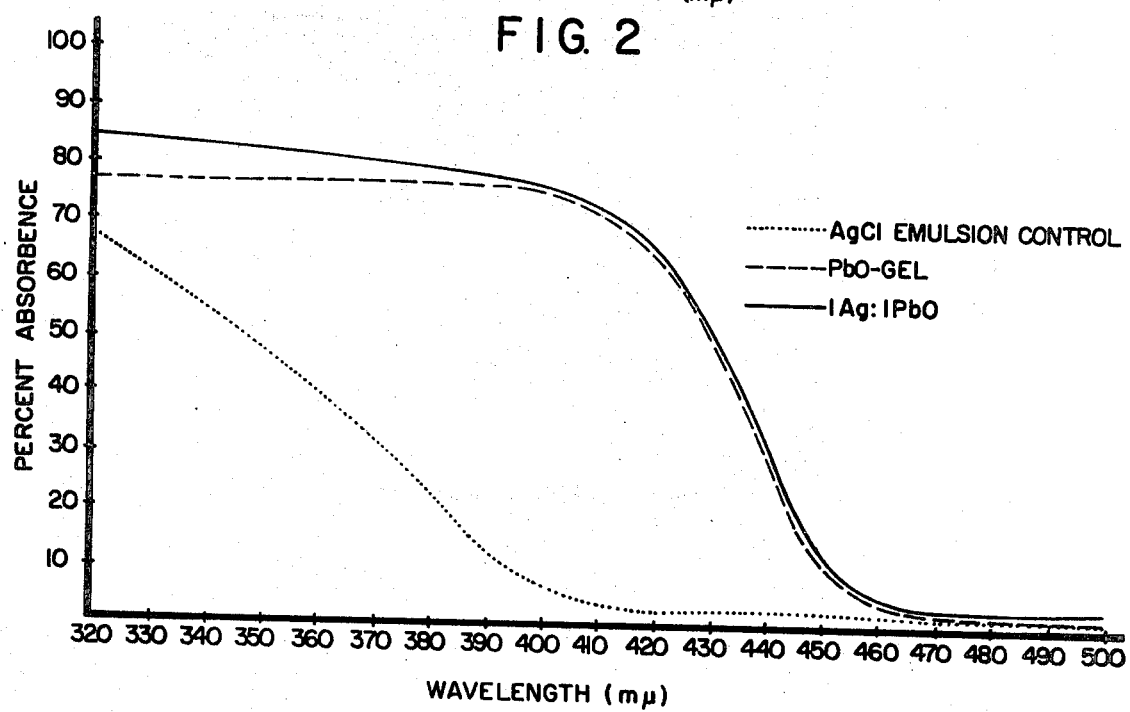

For a fuller understanding of the nature and objects of the invention, reference should be had to the following detailed description taken in connection with the accompanying drawings wherein:

FIG. 1 is a graphical comparison of the action spectra, as determined on a wedge spectrograph, of an orthorhombic lead oxide-sensitized silver bromide emulsion (solid line) and an unsensitized silver bromide emulsion (broken line);

FIG. 2 is a graphical comparison of the action spectra, as determined on a wedge spectrograph, of an orthorhombic lead oxide-sensitized silver chloride emulsion (solid line) and an unsensitized silver chloride emulsion (broken line); and FIG. 3 is a graphical comparison of the absorbence spectra of an orthorhombic lead oxide-sensitized silver chloride emulsion (solid line), an unsensitized silver chloride emulsion (broken line), and a gelatin dispersion of orthorhombic lead oxide (dotted line).

The photographic effects of materials which have heretofore been employed as spectral sensitizers for silver halide have been found to be closely related to electron or energy transfer between the sensitizing compounds and the silver halide crystals. Specifically with reference to the electron transfer mechanism, spectral sensitization of the photographic process is believed to occur by the passage of an electron from the sensitizing material, optically excited as a result of incident actinic radiation, to the conduction band of the silver halide crystals. While considerable research has been carried out regarding the above mechanism in conjunction with conventional spectral sensitizers, i.e., cyanine dyes, there have heretofore been no attempts to employ inorganic materials having similar electron-transfer potential as sensitizers in photographic silver halide emulsions.

It has now been found that solid dispersions of certain inorganic semiconductor materials may be effectively employed to confer enhanced sensitivity on photographic silver halide emulsions. Specifically, solid dispersions of particulate orthorhombic lead oxide have been found to provide to silver halide crystals dispersed in a colloid binder, frequency-selective electromagnetic radiation response characteristics as will be described hereinafter. Such sensitization is effected by bringing the silver halide crystals into intimate physical contact, for example, by simple mixing or selective precipitation, with the orthorhombic lead oxide, thereby providing a solid-solid interaction at the silver halide-lead oxide interface.

That sensitization may be so brought about is both surprising and unexpected, in view of the fact that there has heretofore been no suggestion that inorganic, water-insoluble compounds have any effect as regards the sensitivity of gelatino silver halide emulsions except where discussed supra as chemical sensitizers, and even in the latter instance, such compounds have been employed in soluble form and in extremely small quantity, far too small, in fact, to provide any significant solid-solid interaction of the type which is believed to take place in the practice of the instant invention, as detailed below.

While the present invention is by no means limited thereby, the following theoretical considerations are believed to account for the unexpected ability of orthorhombic lead oxide to extend the spectral response characteristics of silver halides dispersed in a colloid binder medium. (For the sake of simplicity, silver bromide is used to explain the various interactions; however, it will be obvious to those of familiarity with semiconductor theory that other silver halides, i.e., silver chloride and silver iodide, or mixed halides, e.g., silver iodobromide and silver chloroiodobromide, would behave similarly in the presence of orthorhombic lead oxide.) When silver bromide, which may be considered an N-type semiconductor, having a band gap energy of 2.5 ev is brought into contact with solid orthorhombic lead oxide, which may be considered a P-type semiconductor having a lower Fermi level and a smaller band gap energy then the silver bromide, and the conduction band of which possesses an energy level higher than that of the silver bromide, certain changes are believed immediately to take place prior to photoexposure. Specifically, there is believed to be a flow of electrons from the N-type silver bromide to the P-type lead oxide, resulting in an equalization of the Fermi levels of the respective materials. Consequently, in accordance with well-known semiconductor theory (see, for example, Nussbaum, A., *Semiconductor Device Physics*, Prentice Hall, New Jersey, 1962, at page 93), and Bube, R. H., *Photoconductivity of Solids*, John Wiley & Sons, New York, 1960, at page 78), as a result of the increased concentration of electrons in the P-type lead oxide and corresponding increased concentration of positive holes in the N-type silver bromide, a space charge is developed in the region of the interface which extends into the respective bulk phases for distances of the order of a micron. (With small particulate materials such as silver halide crystals, this space charge may extend throughout a significant portion of the system.) The polarity is such as to leave the N-type silver bromide positively charged and the P-type lead oxide negatively charged.

Upon exposure to light, absorption of light by the P-type lead oxide beyond the region of intrinsic absorption of the silver bromide raises electrons from the valence band into the conduction band of the lead oxide. Owing to the space charge which was established prior to exposure, electrons are now able to flow across the interface from the lead oxide to the silver bromide, at which point they become available for latent image formation. Practically speaking, this results in new peaks in the action spectrum of the lead oxide-sensitized silver bromide as compared with that of the unsensitized material. This effect will be demonstrated in examples which follow infra, wherein it will be seen that orthorhombic lead oxide does in fact extend the spectral response of silver halide emulsions.

For purposes of illustrating the preceding description of the invention and in carrying out same, for example, for the production of a photographic film element employing a photoresponsive gelatino silver halide emulsion employing sensitized photoresponsive silver halide crystals, the silver halide crystals may be prepared by reacting a water-soluble silver salt, such as silver nitrate, with at least one water-soluble halide, such as ammonium, potassium or sodium bromide, preferably together with a corresponding iodide, in an aqueous solution of a peptizing agent such as a colloidal gelatin solution; digesting the dispersion at an elevated temperature, to provide increased crystal growth; washing the resultant dispersion to remove undesirable reaction products and residual water-soluble salts by chilling the dispersion, noodling the set dispersion, and washing the noodles with cold water, or alternatively, employing any of the various flocc systems, or procedures, adapted to effect removal of undesired components, for example, the procedures described in U.S. Pat. Nos. 2,614,928; 2,614,929; 2,728,662; and the like; after-ripening the dispersion at an elevated temperature in combination with the addition of gelatin and various adjuncts, all according to the traditional procedures of the art, as described in Neblette, C. B., *Photography—Its Materials And Processes*, 6th Ed., 1962.

The orthorhombic lead oxide sensitizer of the present invention may be suspended in particulate form in a liquid medium in which it is insoluble and which is nondeleterious to photographic emulsions, such as water, $CH_3OH$ or other lower molecular weight alcohol, or a mixture of water and alcohol; the suspension so formed is then added to the above-described emulsion, and the mixture stirred for about 2 to 4 minutes, and then coated upon a suitable support.

Alternatively, the silver halide may be precipitated in the presence of the lead oxide sensitizer in such a way that a core-shell configuration is obtained, with either material, i.e., the silver halide crystal or a lead oxide particle, comprising either the core or the shell.

With respect to sensitizer:photoresponsive material ratio, widely varying ratios have been observed to be effective. In particular, silver halides have been effectively sensitized according to the present inventive concept, by utilizing molar ratios from 1 silver halide:1 lead oxide to 1 silver halide:0.01 lead oxide, although higher or lower ratios may be suitable, depending upon emulsion and sensitizer characteristics.

The particle size of the lead oxide sensitizer particles has been found not to be critical, except that it will be obvious to those familiar with semiconductor theory that the particle size and configuration must be such as to provide for adequate interfacial contact between the silver halide crystals and sensitizer particles. In practice, sonified suspensions of orthorhombic lead oxide have been found to give particularly good results, since the submicroscopic lead oxide particles can then form an actual layer on the silver halide crystals. However, it will be appreciated from the foregoing discussion of theoretical considerations that the sensitizing activity of orthorhombic lead oxide is not dependent upon the formation of an actual sensitizer layer as such; rather, electron transfer can take place readily provided there is at least minimum surface contact between the respective reactants. Insofar as silver halide sensitization is concerned, there is no theoretical maximum particle size for the lead oxide. However, the particles should be of sufficiently small size, as well as concentration, so as not to interfere with the photographic characteristics of the silver halide emulsion, as by reflecting and/or scattering incident actinic radiation to any significant extent. Thus, for example, for conventional silver halide emulsion layers having a thickness of about 0.6 to 20 microns wherein the silver halide grains present have an average particle size distribution in the order of 0.1 to 10 microns, it is preferred that the lead oxide particles be present at an average particle size distribution of 0.1 to 10 microns or less. Obviously, the smaller the sensitizer particle size, the smaller the quantity of sensitizer on an absolute weight basis required to sensitize a given quantity of a colloid-dispersed silver halide. It will be appreciated that absolute numbers as applied to lead oxide particle size and ratio of lead oxide to silver halide are only meaningful with respect to a single given silver halide emulsion system; one of ordinary skill in the art possessing the present invention would readily be able to determine empirically the specific parameters which must be utilized to give optimum sensitizing results in the practice of the invention.

Orthorhombic lead oxide particles for use within the scope of the present invention may be prepared by any of the conventional techniques, for example, ball mill, sand grinding, ultrasonic, and the like, for the production of particulate solid materials. In general, a wet paste comprising solid lead oxide particles, and optionally, one or more dispersing agents, surfactants, antifoamers, antioxidants, or the like, and water may be processed according to the identified techniques to provide lead oxide particles of the size desired and the output of the process selected, where desired, may be appropriately filtered to effect removal of any particles which may be present exceeding that of a diameter within the particle size range desired.

Conventional sand grinding techniques adapted to mill solid lead oxide particles such as to provide the requisite particle size distribution generally comprise agitating an aqueous lead oxide slurry with a sand, which, for example, may possess a size range of 20 to 40 mesh, until the desired particle size distribution is obtained and then separating the lead oxide from contact with the abrasive sand. Commercial mills, of various capacities, adapted to perform sand grinding, may be procured from the Chicago Boiler Company, Chicago, Illinois.

For the preparation of lead oxide material possessing the desired particle size distribution by ultrasonic techniques, an aqueous lead oxide slurry may be treated employing commercial sonifiers such as those procured from Branson Instruments, Incorporated, Stanford, Connecticut.

As previously detailed, the photoresponsive crystals of the present invention may be employed as the photosensitive component of a photographic emulsion by incorporation within a suitable colloid binder, and the coating and processing of the thus prepared emulsion may be carried out according to conventional procedures known in the photographic manufacturing art.

The photoresponsive crystal material of the photographic emulsion will, as previously described, preferably comprise a crystal of silver, for example, one or more of the silver halides such as silver chloride, silver iodide, silver bromide, or mixed silver halides such as silver chlorobromide, silver iodobromide or silver chloroiodobromide, of varying halide ratios and varying silver concentrations.

The fabricated emulsion may be coated onto various types of rigid or flexible supports, for example, glass, paper, metal, polymeric films of both the synthetic types and those derived from naturally concurring products, etc. Especially suitable materials include paper; aluminum; polymethacrylic acid, methyl and ethyl esters; vinyl chloride polymers; polyvinyl acetals; polyamides such as nylong; polyesters such as the polymeric films derived from ethylene glycol terephthalic acid; polymeric cellulose derivatives such as cellulose acetate, triacetate, nitrate, propionate, butyrate, acetate-butyrate, or acetate-propionate; polycarbonates; and polystyrenes.

The emulsions may include the various adjuncts, or addenda, according to the techniques disclosed in the art, such as speed increasing compounds of the quaternary ammonium type, as described in U.S. Pat. Nos. 2,271,623; 2,288,226; and 2,334,864; or of the polyethyleneglycol type, as described in U.S. Pat. No. 2,708,162; or of the preceding combination, as described in U.S. Pat. No. 2,886,437; of the thiopolymers, as described in U.S. Pat. Nos. 3,046,129 and 3,046,134.

The emulsions may also be stabilized with the salts of the noble metals such as ruthenium, rhodium, palladium, iridium and platinum, as described in U.S. Pat. Nos. 2,566,245 and 2,566,263; the mercury compounds of U.S. Pat. Nos. 2,728,663; 2,728,664; and 2,728,665; the triazoles of U.S. Pat. No. 2,444,608; the azindines of U.S. Pat. Nos. 2,444,604; 2,444,606; 2,444,607; 2,450,397; 2,444,609; 2,713,541; 2,743,181; 2,716,062; 2,735,769; 2,756,147; 2,772,164; and those disclosed by Burr in "Zwiss. Pot.," Volume 47, 1952, pages 2-28; the disulfides of Belgian Pat. No. 569,317; the benzothiazolium compounds of U.S. Pat. Nos. 2,131,038 and 2,694,716; the zinc and cadmium salts of U.S. Pat. No. 2,839,405; and the mercapto compounds of U.S. Pat. No. 2,819,965.

Hardening agents such as inorganic agents providing polyvalent metallic atoms, specifically polyvalent aluminum or chromium ions, for example, potash alum

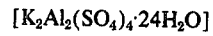

and chrome alum

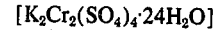

and inorganic agents of the aldehyde type, such as formaldehyde, glyoxal, mucochloric, etc.; the ketone type such as diacetyl; the quinone type; and the specific agents described in U.S. Pat. Nos. 2,080,019; 2,725,294; 2,725,296; 2,725,305; 2,726,162; 2,732,316; 2,950,197; and 2,870,013, may be incorporated in the emulsion.

The emulsion may also contain one or more coating aids such as saponin; a polyethyleneglycol of U.S. Pat. No. 2,831,766; a polyethyleneglycol ether of U.S. Pat. No. 2,719,087; a taurine of U.S. Pat. No. 2,739,891; a maleopimarate of U.S. Pat. No. 2,823,123; an amino acid of U.S. Pat. No. 3,038,804; a sulfosuccinamate of U.S. Pat. No. 2,992,108; or a polyether of U.S. Pat. No. 2,600,831; or a gelatin plasticizer such as glycerin; a dihydroxyalkane of U.S. Pat. No. 2,960,404; a bis-glycolic acid ester of U.S. Pat. No. 2,904,434; a succinate of U.S. Pat. No. 2,940,854; or a polymeric hydrosol of U.S. Pat. No. 2,852,386.

As the binder for photosensitive crystals, the aforementioned gelatin may be, in whole or in part, replaced with some other colloidal material such as albumin; casein; or zein; or resins such as a cellulose derivative, as described in U.S. Pat. Nos. 2,322,085 and 2,327,808; polyacrylamides, as described in U.S. Pat. No. 2,541,474; vinyl polymers such as described in U.S. Pat. Nos. 2,253,078; 2,276,322; 2,276,323; 2,281,703; 2,310,223; 2,311,058; 2,311,059; 2,414,208; 2,461,023; 2,484,456; 2,538,257; 2,579,016; 2,614,931; 2,624,674; 2,632,704; 2,642,420; 2,678,884; 2,691,582; 2,725,296; 2,753,264; and the like.

The photographic emulsions may be employed in black and white or color photographic systems, of both the additive and subtractive types, for example, those described in Potography—Its Materials And Processes, supra. The photoresponsive crystals may also be employed in the fabrication of photographic emulsions which form latent images predominantly on the surface of the crystal or in emulsions which form latent images predominantly inside the crystal such as those described in U.S. Pat. No. 2,592,250.

The fabricated emulsions may also be employed in silver diffusion transfer processes of the types set forth in U.S. Pat. Nos. 2,352,014; 2,500,421; 2,543,181; 2,563,342; 2,565,376; 2,584,029; 2,584,030; 2,603,565; 2,616,807; 2,635,048; 2,644,656; 2,647,055; 2,662,822; 2,698,236; 2,698,237; 2,698,238; 2,698,245; 2,702,244; 2,704,721; 2,740,715; 2,759,825; 2,774,667; 2,823,122; 2,923,623; 2,938,792; 2,962,377; 2,984,565; 3,003,875; 3,043,690; 3,087,815; 3,087,816; 3,091,530; 3,108,001; and 3,113,866; in additive color diffusion transfer processes of the types disclosed in U.S. Pat. Nos. 2,614,926; 2,726,154; 2,944,894; 2,992,103; and 3,087,815; and in subtractive color diffusion transfer processes of the types disclosed in U.S. Pat. Nos. 2,559,643; 2,600,996; 2,614,926; 2,647,049; 2,661,293; 2,698,244; 2,698,798; 2,774,668; 2,802,735; 2,855,299; 2,892,710; 2,909,430; 2,968,554; 2,983,605; 2,983,606; 2,992,104; 2,992,105; 2,992,106; 2,997,390; 3,003,872; 3,015,501; 3,019,104; 3,019,124; 3,022,166; 3,022,167; 3,039,869; 3,043,689; 3,043,692; 3,444,873; 3,047,386; 3,065,074; 3,069,262; 3,069,263; 3,069,264; 3,076,808; 3,076,320; 3,077,400; and 3,077,402.

As taught in the art, the concentration of silver halide crystals forming the photographic emulsion and the relative structural parameters of the emulsion layer, for example, the relative thickness, and the like, may be varied extensively and drastically, depending upon the specific photographic system desired and the ultimate employment of the selective photographic system.

In conventional photographic processes, for the formation of silver images, a latent image is provided by selective exposure of a photosensitive photographic emulsion, generally containing the aforementioned photoresponsive silver halide crystals or the like. The thus-produced latent image is developed, to provide a visible silver image, by a suitable contact with any of the infinite number of photographic developing solutions set forth in the art. For the purpose of enhancing the resultant visible image's stability, the image may be suitably fixed, according to the procedures also well known to those skilled in the art. The resultant image-containing element may be then directly employed or, optionally, may be employed, where applicable, as a negative image, for example, to provide a reversed or positive image by conventional contact or projection printing processes employing suitable photosensitive printing papers.

In the conventional photographic subtractive color processes which find extensive commercial utilization, color coupling techniques are generally employed to provide the requisite number of registered color images necessary for monochromatic and multichromatic reproduction. According to these techniques, one or more photoresponsive, generally gelatinous, selectively photoresponsive silver halide strata are selectively exposed to provide latent image record formation corresponding to the chromaticity of the selected subject matter. The resultant latent images are suitably developed by selective intimage contact between one or more color developing agents and one or more color formers or couplers to provide the requisite negative color images. Alternatively, the latent images are developed to provide visible silver images; the resultant visible images removed; the remaining or residual silver halide exposed, and the second-formed exposure records developed by selective contact between one or more color developing agents and one or more color formers or couplers, in the presence of exposed silver halide to provide the desired colored positive image.

In diffusion transfer processes, for the formation of positive silver images, a latent image contained in an exposed, photosensitive, generally gelatinous, silver halide emulsion is developed and, substantially contemporaneous with development, a soluble silver complex is obtained by reaction of a silver halide solvent with the unexposed and undeveloped silver halide of the emulsion. The resultant soluble silver complex is, at least in part, transported in the direction of a suitable print-receiving element, and the silver of the complex precipitated in such element to provide the requisite positive image definition.

Additive color reproduction may be produced by exposing a photosensitive silver halide emulsion through an additive color screen having filter media or screen elements, each of an individual additive color such as red, blue, or green, and by viewing the resultant image, subsequent to development, through the same or a similar screen element. Alternatively, the photosensitive element may be employed to provide a silver transfer image analogous to the preceding description of diffusion transfer processes and the resultant transfer image may be viewed through the same, or a similar, additive color screen which is suitably registered with the silver transfer image carried by the print-receiving image.

The present invention will be illustrated in greater detail in conjunction with the following specific examples, which set out representative photographic products and processes in which dispersions of orthorhombic lead oxide are effectively employed to achieve silver halide sensitization; the examples, however, intended to be illustrative and not of limiting sense.

EXAMPLE I

A silver bromide emulsion was prepared utilizing solutions which comprise:

Solution A (prepared at 60° C.)
Silver nitrate 200 gms. (1.18 moles)
Distilled water 1,600 ml.

Solution B (prepared at 70° C.)
Potassium bromide 141.4 gms. (1.19 moles)
Solution formed by dissolving
800 gms. of inert gelatin at
40° C. in 8,800 ml. of distilled
water and controlling the pH at
10; then adding 88 gms. of
phthalic anhydride in 616 ml.
of acetone and adjusting the pH
to 6 226 gms.
Distilled water 1,280 ml.

Solution A was added to solution B with agitation over a 30-minute time period with agitation. Subsequently the emulsion was cooled to 20° C. and flocculated with $2NH_2SO_4$ to prepare for washing. Chilled distilled water was then used to wash the emulsion until the specific conductance of the wash water was under 100 micromhos. After the final wash water was decanted, the emulsion weight was brought to 450 grams with distilled water. The pH was then raised to 5.7 with 2N NaOH while mixing constantly to obtain homogeneity. The concentrated emulsion so prepared was chilled to gel in a shallow covered glass tray, and diced into cubes, after setting, for homogeneous storage.

An aqueous particulate dispersion of orthorhombic lead monoxide was prepared by sonification of lead monoxide (Baker Chemical Company, No. 2340) in water with a Branson Sonic Power Company sonifier model J17A for just under 2 minutes.

To a portion of the emulsion prepared above equivalent to $9.3 \times 10^{-3}$ moles of silver (1 gram) was added bulk inert gelatin and distilled water, to give a homogeneous emulsion 6.1 percent in silver and 13.3 percent in gelatin. To this emulsion was added a dispersion of $9.3 \times 10^{-3}$ moles of the orthorhombic lead monoxide (2.1 grams) in 15 ml. of distilled water prepared above, and the mixture stirred at 42° C. for 2 minutes. One ml. of 1 percent aqueous Aerosol OT coating aid was added, the mixture stirred for 30 seconds, and then cast on cellulose triacetate film base to a coverage of about 300 mg. Ag/ft.$^2$.

A similar procedure was followed with two other portions of the emulsion, each of which contained the equivalent of 1 gram of silver, with one of the portions being treated with $4.7 \times 10^{-3}$ moles of orthorhombic lead monoxide (1.1 grams) in 15 ml. of distilled water, and the other portion being a control, in that no lead oxide was added along with the 15 ml. of distilled water. Aerosol OT was added to both portions as described above, and the two emulsions so prepared were cast on cellulose triacetate film base to a coverage of 300 mg. Ag/ft.$^2$.

All three emulsions were exposed for approximately 2 seconds with a tungsten light source of a Polaroid Wedge Spectrograph and developed using a Polaroid Type 42 diffusion transfer system with an inhibition period of ten seconds and a processing gap of 0.0022 inch. Duplicate exposures employing the same emulsions were wet-processed by submerging the exposed films in undiluted Dektol Developer (trademark of Eastman Kodak Company for a developer comprising 1,500 gms. of water, 30 gms. p-methylaminophenol sulfate, 45 gms. dessicated sodium sulfite, 12 gms. hydroquinone, 80 gms. monohydrated sodium carbonate and 2 gms. potassium bromide) for 1 ¾ minutes at 22° C. with agitation, stopping in 4 percent acetic acid for 1 minute, fixing for 2 minutes in undiluted Rapid Fixing Bath (tradename of Eastman Kodak Company for a fixing bath comprising 600 cc. of water, 360 gms. of sodium thiosulfate, 50 gms. of ammonium chloride, 15 gms. of desiccated sodium sulfite, 47 cc. of 28 percent acetic acid, 7.5 gms. of boric acid crystals, and 15 gms. of potassium alum) washing thoroughly with water, and drying.

A comparison of the action spectra of the respective emulsions as measured on the Polaroid Wedge Spectrograph revealed that whereas the emulsion containing no lead oxide exhibited a peak at 425 m$\mu$, the emulsions sensitized with orthorhombic lead oxide in a 1:1 molar ratio with respect to silver bromide exhibited a new peak at 450 m$\mu$, for which there was no corresponding peak in the control; moreover, a overall sensitivity in the sensitized emulsions extended to 510 m$\mu$, as compared with 480 m$\mu$ in the emulsion containing no lead oxide.

The emulsion containing only 4.7 × $10^{-3}$ moles of orthorhombic lead oxide exhibited essentially the same characteristics as those of the emulsion containing twice as much, except that the peak at 450 m$\mu$ was not quite as pronounced.

FIG. 1 shows the action spectra of the silver bromide emulsion sensitized with orthorhombic lead oxide (comprising a 1:1 molar ratio of silver bromide to lead oxide prepared as described above) as determined on the wedge spectrograph, reproduced as a solid line, as compared with that of the control emulsion containing no lead oxide, represented by the broken line. Reference thereto indicates the increased spectral response in the orthorhombic lead oxide-sensitized material.

EXAMPLE II

A silver chloride emulsion was prepared utilizing solutions which comprise:

| | |
|---|---|
| Solution A | |
| Silver nitrate | 2,000 gms. |
| Distilled water | To make 14,200 mls. of solution |
| | |
| Solution B | |
| Potassium chloride | 890 gms. |
| Distilled water | To make 14,000 mls. of solution |
| | |
| Solution C | |
| Potassium chloride | 453 gms. |
| Solution formed by dissolving 800 gms. of inert gelatin in 8,800 ml. of distilled water at 40° C. and controlling the pH at 10; adding 88 gms. of phthalic anhydride in 616 ml. of acetone over a 30 minute period; mixing for 30 minutes at 40° C.; adjusting the pH to 6; agitating for 10 minutes; and refrigerating | |
| Distilled water | 2,500 gms. To make 6,000 mls. of solution |

Solution A at 60° C. and Solution B at 60° C. were added simultaneously to Solution C at 80° C. with agitation over a 35-minute time period. The flocculation and washing procedures used for this emulsion were the same as those used in the emulsions of Example I. After the last wash water was decanted, 893 gms. of bulk gelatin was added along with enough water to bring the total emulsion weight to 9,979.0 gms. The bulk gelatin was swelled in the emulsion for 35 minutes. The temperature was brought to 38° C. and agitation was applied to dissolve the bulk gelatin. The pH was raised to 5.7 with 10% NaOH and the emulsion was mixed well. The temperature was then raised to 54° C. and the emulsion was ripened (with agitation) with 13.7 mls. 0.32 percent sodium thiosulfate and 27.5 mls. of gold thiocyanate sensitizer for 150 minutes. The emulsion was then refrigerated.

To a portion of the above emulsion containing the equivalent of 18.6 × $10^{-3}$ moles of silver (2 grams) was added inert gelatin and distilled water, to yield a homogeneous emulsion 4.8 percent in silver and 10.7 percent in gelatin. To this emulsion was added 18.6 × $10^{-3}$ moles of orthorhombic lead oxide dispersed in 21 ml. of distilled water prepared as in Example I, followed by 20 ml. more of distilled water that had been used to rinse the dispersion container. The mixture was stirred at 40° C. for 2 minutes. A control emulsion was fabricated according to the same procedure, except that no lead oxide was present in the water. Four mls. of 1 percent aqueous Aerosol OT coating aid were added to each emulsion, the emulsions were then stirred for 2 minutes, and then cast on a cellulose triacetate film base to a coverage of approximately 200 mg. Ag/ft.². The emulsions were then exposed with a Polaroid Wedge Spectrograph as described in Example I for about 16 minutes and processed using a Polaroid Type 42 diffusion transfer system, with a 0.0030-inch gap and an imbibition period of 10 seconds.

A comparison of the action spectra of the respective emulsions as measured on a Polaroid Wedge Spectrograph revealed that whereas the emulsion containing no lead oxide exhibited a peak at 380–400 m$\mu$, the emulsions sensitized with orthorhombic lead oxide exhibited a new peak at 450 m$\mu$, for which there was no corresponding peak in the control; moreover, overall sensitivity in the sensitized emulsions extended to 520 m$\mu$, as compared with a narrow tailing out to 450 m$\mu$, in the emulsion containing no lead oxide.

FIG. 2 shows the action spectra of the silver chloride emulsion sensitized with orthorhombic lead oxide (comprising a 1:1 molar ratio of silver chloride to lead oxide prepared as described above) as determined on the wedge spectrograph, reproduced as a solid line, as compared with that of the control emulsion containing no lead oxide, represented by the broken line. Reference thereto indicates the increased spectral response in the orthorhombic lead oxide sensitized material.

As confirmation of the behavior of orthorhombic lead oxide as a sensitizer in accordance with the theory detailed previously, the absorption spectra of the silver chloride-orthorhombic lead oxide system prepared above, the unsensitized silver chloride control prepared above, and a silver halide-free gelatin dispersion of orthorhombic lead oxide (5.0 weight percent gelatin and 4.6 weight percent lead oxide, prepared by adding an aqueous dispersion containing 12.2 weight percent lead oxide to an 8.6 weight percent aqueous gelatin solution along with coating aid, and mixing and coating the dispersion as described supra for the gelatino silver chloride emulsions) were calculated from the transmission and reflection spectra as measured in an integrating sphere of a Cary 14 spectrophotometer. FIG. 3 is a graphical comparison of the absorbence spectra of the three materials, where the silver chloride-lead oxide system is represented by a solid line, the unsensitized silver chloride by a broken line, and the lead oxide along by a dotted line. A comparison of the spectra shown in FIG. 3 with the action spectra of FIG. 2 shows that reflections from the lead oxide alone in the region of 450 m$\mu$ do not account for the new peaks seen in the action spectra of the lead oxide-silver chloride emulsion as shown in FIG. 2 and thus, are the result of sensitization of the silver chloride by the lead oxide rather than being the result of light scattering by the dispersed lead oxide particles.

EXAMPLE III

To test for the possibility that Pb$^{II}$ ions were the cause of the effects observed in Examples I and II, a solution comprising 0.036 g. of Pb(NO$_3$)$_2$ in 4.5 ml. of water was added to a silver bromide emulsion prepared as in Example I. This concentration was selected so as to clearly exceed the solubility of orthorhombic lead oxide based on the water content of emulsions prepared as in Examples I and II prior to coating. No effect was observed in the spectral response characteristics of the silver bromide emulsion so treated. A similar test was conducted using the supernatant liquid obtained from a water suspension of orthorhombic lead oxide; again, no change in the spectral response characteristics of the emulsion was detectable.

As will be appreciated from the foregoing description and examples, it has now unexpectedly been discovered that orthorhombic lead oxide can be effectively employed as a spectral sensitizer for silver halide crystals distributed in a colloid binder. Moreover, the increased spectral sensitivity of the emulsion is directly attributable to the presence of lead oxide particles as a solid phase in the emulsion, as is clearly demonstrated by the fact that no such spectral sensitization is demonstrable using a corresponding solubilized lead ion.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. A light-sensitive photographic emulsion comprising silver halide crystals distributed in a colloid binder, and orthorhombic lead oxide in intimate physical contact with said silver halide crystals effective to extend the electromagnetic radiation response characteristics of said silver halide crystals.

2. The invention of claim 1 wherein said colloid binder comprises gelatin.

3. The invention of claim 1 wherein said orthorhombic lead oxide is present as a solid particulate dispersion.

4. The invention of claim 1 wherein said orthorhombic lead oxide is present in a molar ratio of from approximately 1:1 to 0.01 to 1 with respect to said silver halide.

5. A method of spectrally sensitizing photographic emulsion comprising silver halide crystals in a colloid binder comprising adding to said photographic emulsion an aqueous suspension of particulate orthorhombic lead oxide.

6. The method of claim 5 wherein said aqueous suspension is a sonified suspension.

7. The method of claim 5 wherein said orthorhombic lead oxide comprises a molar ratio of from approximately 1:1 to 0.01 to 1 with respect to said silver halide crystals.

8. The method of claim 5 wherein said colloid binder comprises gelatin.

* * * * *